United States Patent [19]
Nicolson et al.

[11] 3,983,422
[45] Sept. 28, 1976

[54] DETECTOR HAVING A CONSTANT FALSE ALARM RATE

[75] Inventors: Alexander M. Nicolson, Concord; Richard M. Mara, Tewksbury, both of Mass.

[73] Assignee: Sperry Rand Corporation, New York, N.Y.

[22] Filed: Apr. 16, 1975

[21] Appl. No.: 568,644

[52] U.S. Cl. ................................ 307/322; 307/296
[51] Int. Cl.² ............................................ H03K 1/12
[58] Field of Search .................. 307/296, 297, 322; 328/110

[56] References Cited
UNITED STATES PATENTS

| | | | |
|---|---|---|---|
| 3,755,696 | 8/1973 | Nicolson et al. | 307/296 |
| 3,858,204 | 12/1974 | Robbins et al. | 343/7 A |

Primary Examiner—Stanley D. Miller, Jr.
Assistant Examiner—B. P. Davis
Attorney, Agent, or Firm—Howard P. Terry; Thomas J. Scott

[57] ABSTRACT

A detector which is subject to temperature variations and power supply drift including a tunnel diode circuit having first and second stable states and a variable threshold that is sensitive to noise and input signals within a useful frequency band and produces output signals when the amplitude of the noise or the input signals exceeds the instantaneous value of the variable threshold to cause the tunnel diode to switch from its first low voltage stable state to its second high voltage stable state. A control circuit coupled to the tunnel diode produces a square range-gate pulse having a pulse width which determines the interval during which the detector is sensitized and produces a reset pulse in response to the leading edge of the square range-gate pulse which sets the tunnel diode in its first stable state. A logic circuit also coupled to the tunnel diode produces an output signal indicative of the occurrence of noise or an input signal having an amplitude which exceeds the instantaneous value of the variable threshold occurring during the interval established by the range-gate pulse produced by the control circuit.

12 Claims, 4 Drawing Figures

DETECTOR HAVING A CONSTANT FALSE ALARM RATE

BACKGROUND OF THE INVENTION

1. Field of the Invention

The invention pertains generally to the art of detector circuits and specifically to those circuits which are used to detect input signals having amplitudes which are within the same range as the amplitude of the noise present within the useful frequency band of the detector.

2. Description of the Prior Art

A constant false alarm rate detector was disclosed by A. M. Nicolson and R. J. Brophy in the U.S. Pat. No. 3,755,969 entitled "Detector Having A Constant False Alarm Rate and Method For Providing Same," issued Aug. 28, 1973 and assigned to the same assignee as the subject invention. As disclosed therein, a detector subject to temperature variations and power supply drift is included in an avalanche transistor circuit having a variable threshold sensitive to input signals within a useful frequency band and noise which produced threshold signals when the amplitude of the input signals or the noise exceeded the instantaneous value of the variable threshold. The rate at which the threshold signals were produced was determined in an N-bit storage device coupled to the avalanche transistor circuit. The storage device was coupled to an N-input summation circuit which provided a feedback signal in the form of a variable amplitude output signal in which the amplitude varied at a rate proportional to the rate at which threshold signals were produced by the avalanche transistor. The variable amplitude signal was applied to a series circuit which shunted the collector current of the avalanche transistor circuit at a rate commensurate with the rate that the variable amplitude signal varied in response to noise but at a substantially lower rate than the rate the variable amplitude signal varied in response to input signals having an amplitude greater than the instantaneous value of the avalanche transistor variable threshold. As further disclosed therein, a gate circuit produced a pulse which was coupled into the emitter of the avalanche transistor to control the period of time during which breakdown of the avalance transistor could occur in response to noise or input signals having amplitudes greater than the threshold level of the avalance transistor.

As generally known to those skilled in the art, avalanche transistors have to be chosen by the manufacturers from among a set of given transistors and although the yield can often be high, manufacturers do not supply avalanche transistors with specified performance in the avalanche region. Further, the power supply voltage used with avalanche transistors is not compatible with the 5 volt power sources used with conventional digital logic elements. A tunnel diode, on the other hand, has the advantage of being a device which is commercially available with specified parameters. Thus the improved detector disclosed herein does not require circuit adjustments to compensate for different parameters in the variable threshold device, because the parameters in the tunnel diodes are specified and it is merely a matter of direct replacement to substitute one tunnel diode having the same parameters for another. Whereas with avalanche transistors the performance in the avalanche region is not specified. Therefore it requires additional testing and circuit adjustments to insure similar operation after substituting one avalanche for another.

Furthermore, the control circuit described herein enables the time interval during which the tunnel diode detection device is sensitive to be controlled with nanosecond precision.

SUMMARY OF THE INVENTION

The present invention is an improved constant false alarm rate detector circuit in which the variable threshold circuit includes a bistable device such as a tunnel diode which has a first low voltage stable state and a second high voltage stable state and a variable threshold level which is sensitive to both noise and input signals applied to the input of the detector. The variable threshold circuit also includes a control circuit which determines the range gating interval of the detector by providing a square range-gate pulse or gating pulse and controls the sensitivity of the bistable device by providing a reset pulse which sets the bistable device to its first low voltage stable state. The reset pulse has a shorter pulse width or duration than the square gating pulse and may be produced by differentiating the leading edge of the square gating pulse.

The improved variable threshold circuit also includes a logic circuit coupled to the bistable circuit means which provides an output signal in response to switching of the bistable element from its first low voltage state to its second high voltage state which occurs during the interval established by the gating pulse provided by the control circuit. The output pulse is coupled into a pulse stretcher which produces output pulses that are coupled into first and second counters.

The first counter has a preset threshold reprsented by M such that when the total number of pulses registered in the first counter is equal to or greater than M an output signal indicative of the presence of a target or an alarm condition is indicated.

The second counter provides an analog output signal proportional to the number of pulses produced by the pulse stretcher and the rate at which the analog output signal is varied is proportional to the rate at which the pulses are produced by the pulse stretcher. The analog output signal is coupled through a series feedback circuit including a long time constant low pass filter which controls the d.c. bias current from the supply voltage to the bistable circuit device thereby maintaining a constant false alarm rate in the detector circuit.

DESCRIPTION OF THE PREFERRED EMBODIMENT

Figure 1:
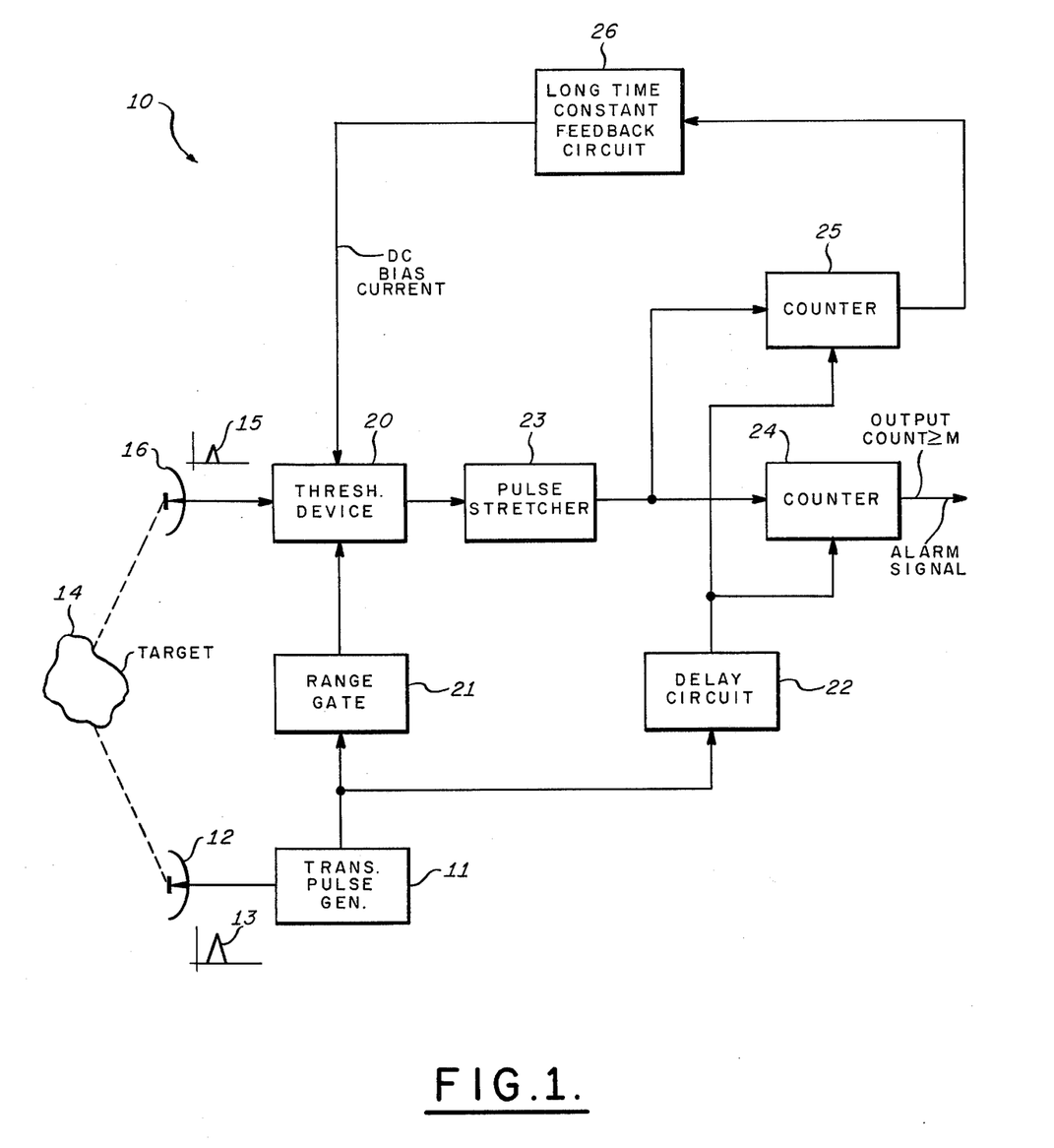
FIG. 1 is a schematic block diagram of a constant false alarm rate detector.

As shown in FIG. 1 a constant false alarm rate detector 10 includes a transmitter pulse generator 11 coupled to a transmitting antenna 12 for providing a base band signal of subnanosecond duration such as the pulse 13. As described in the aforementioned U.S. Pat. No. 3,755,696, the transmitter pulse generator 11 and the antenna 12 may be components of the integrated type as described in the transmitter-radiator system taught by G. F. Ross and D. Lamensdorf in U.S. Pat. No. 3,659,203, issued Apr. 25, 1972 and assigned to the same assignee as the subject invention. The pulse 13 is radiated in the direction of a target 14 and a reflected pulse 15 received by a receiving antenna 16 and is coupled into a threshold device 20. The transmitter pulse generator 11 is also coupled to a range gate 21 and a delay circuit 22. A clock pulse produced by the transmitter pulse generator 11 which initiates the transmission of the radiated pulse 13 may also be coupled after a suitable delay in the generator 11 into the range gate 21 and the delay circuit 22.

In the range gate 21 a gating pulse is produced in response to the clock pulse and is coupled into the threshold device 20. The time of occurrence of the leading edge of the gating pulse and its pulse width are varied in order to control the time during which the threshold device 20 will be responsive to either noise or pulses such as the pulse 15 which has amplitudes that exceed the threshold level of the device 20. The clock pulse applied to the delay circuit 22 produces a subsequent output pulse which is coupled to a first counter 24 and a second counter 25. Output signals produced by the threshold device 20 at the time that the delayed pulse from the circuit 22 is applied to the counters 24 and 25 are coupled through a pulse stretcher 23 and registered in the respective counters 24 and 25. The counter 24 has a preset threshold M so that when the number of pulses from the threshold device 20 occurring simultaneously with the delay pulse from the circuit 22 is equal to or greater than the threshold M, an output signal is produced which indicates the detection of a target or an alarm condition.

The second counter 25 sums the number of output signals from the threshold device 20 which are coincident with the output pulse from the delay circuit 22 and produces an analog signal indicative of the number of pulses produced simultaneously with the output pulse from the delay circuit 22 and also indicative of the rate at which these pulses are produced. The analog output signal is coupled through a series feedback circuit 26 including a long time constant low pass filter which controls the amount of d.c. bias current supplied to the threshold device 20 at a rate commensurate with the rate the variable amplitude signal varies in response to noise but at a substantially lower rate than the rate the variable amplitude signal varies in response to input signals.

The counters 24 and 25 are similar to those described in the aforementioned U.S. Pat. No. 3,755,696 in that they have a finite memory, i.e., they register the total number of the ONE or ZERO outputs produced by the pulse stretcher 23 for the previous N transmitter pulses. Thus the counters 24 and 25 must contain a number between 0 and N. Each counter may be comprised of a serial-in, parallel-out shift register with the parallel outputs connected to an analog summation device. Alternatively each counter may be comprised of an up-down counter with the output of the pulse stretcher 23 connected to both the count-up input terminal on the up-down counter and the input terminal of an N-bit, serial-in, serial-out shift register. The output terminal of the shift register would be connected to the count-down input terminal on the up-down counter to ensure that each ONE input to the counter is only effective for the duration of N clock pulses.

Figure 2:
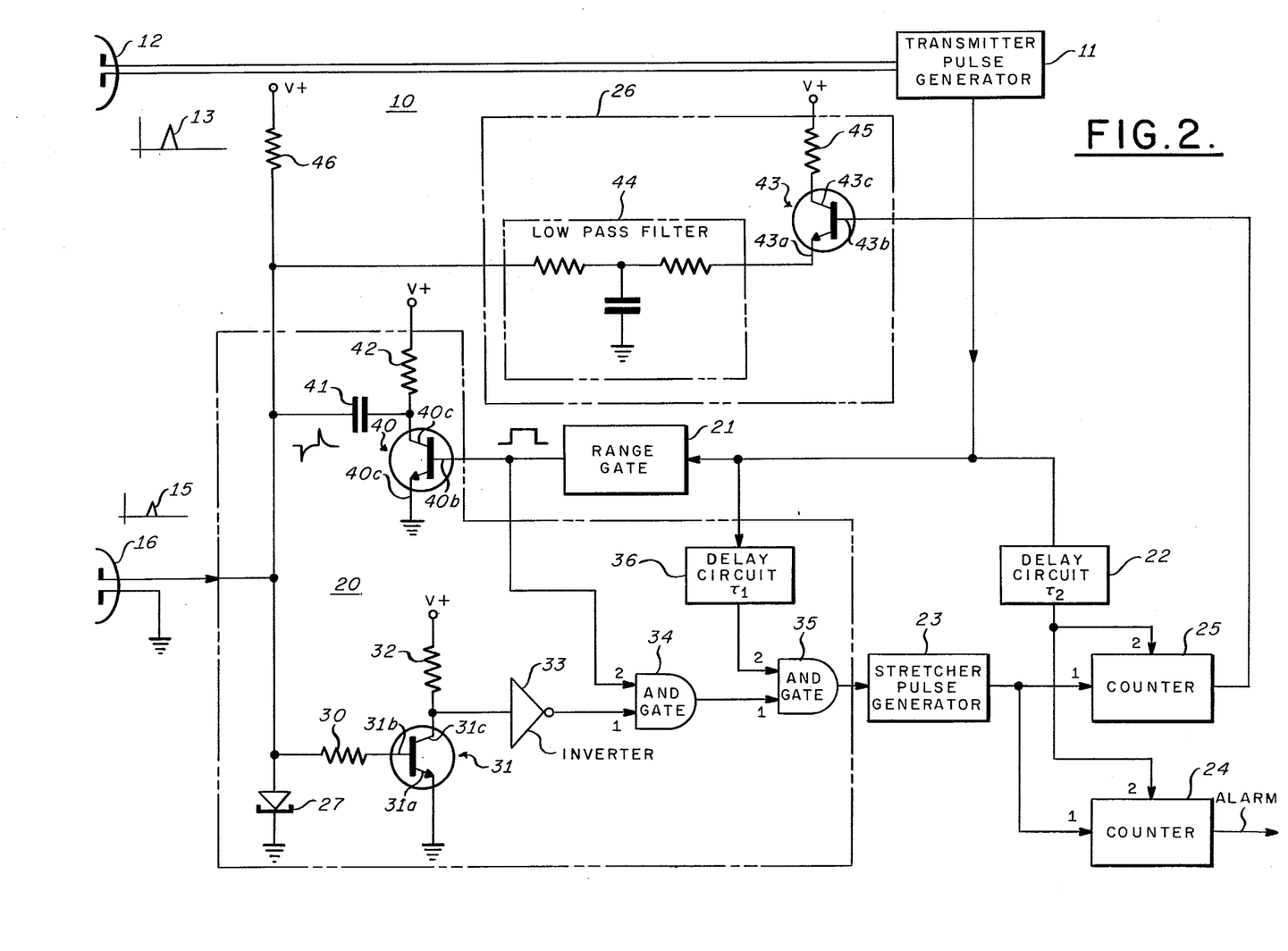
FIG. 2 is a block diagram of a constant false alarm rate detector including details in schematic form of the portion comprising the invention incorporated in the detector.

The constant false alarm rate detector 10 shown in FIG. 2 includes an improved variable threshold device 20 in which a bistable circuit element such as the tunnel diode 27 is coupled to the input of the detector 10. As specifically shown in FIG. 2, the positive electrode of the tunnel diode 27 is coupled to the receiving antenna 16 and the negative electrode of the tunnel diode 27 is connected to ground. A coupling resistor 30 is connected between the positive electrode of the tunnel diode 27 and the base electrode 31b of a transistor amplifier 31. The emitter electrode 31a is connected to ground and the collector electrode 31c is connected to the junction of a first terminal on a resistor 32 and the input of an inverter circuit 33. The second terminal on the resistor 32 is coupled to a source of positive voltage V+.

The output terminal of the inverter 33 is connected to a first input terminal on an AND gate 34 and the second input terminal on the AND gate 34 is connected to the output terminal of the range gate 21. The output terminal of the AND gate 34 is connected to a first input terminal on an AND gate 35 and the second input terminal on the AND gate 35 is connected to an output terminal of a delay circuit 36 which has a time delay $T_1$. The input terminal of the delay circuit 36 is connected to the input terminal of the range gate 21 and the output terminal of the transmitter pulse generator 11.

The output terminal of the AND gate 35 is connected to the input terminal of the stretcher pulse generator 23 which has its output terminal coupled to the first input terminals of first and second counters 24 and 25 respectively. The second input terminals on each of the counters 24 and 25 are connected to the output terminal of the delay circuit 22 which has a time delay $T_2$. The input terminal of the delay circuit 22 is connected to the junction of the input terminals of the range gate 21, the delay circuit 36 and the transmitter pulse generator 11.

The output terminal of the range gate 21 is also connected to the base electrode 40b of a transistor 40 which in combination with a capacitor 41 and a resistor 42 functions as the control circuit for the tunnel diode 27. The emitter electrode 40a is connected to ground and the collector electrode 40c is connected to the junction of the first terminals on the capacitor 41 and the resistor 42. The second terminal on the resistor 42 is connected to the source of positive voltage V+ and the second terminal on the capacitor 41 is connected to the positive electrode on the tunnel diode 27.

The output terminal of the second counter 25 is connected to the base terminal 43b of transistor 43 which is series connected to the input terminal on a long time constant low pass filter 44. The collector electrode 43c is connected to the first terminal on the resistor 45 which has its second terminal connected to a source of positive voltage V+. The output terminal of the low pass filter is connected to the junction of the positive electrode on the tunnel diode 27 and the first terminal on a resistor 46 which has its second terminal connected to a source of positive voltage V+.

In operation the transmitter pulse generator provides a clock pulse which initiates the base band pulse 13 of subnanosecond duration which is coupled to the transmitting antenna 12. The radiated pulse is reflected from a target 14 and received at the receiving antenna 16 as an attenuated base band pulse signal 15 of subnanosecond duration. As stated above, the clock pulse which initiates the transmission of the radiated pulse 13 is required to be delayed prior to being coupled into the range gate 21 and the delay circuit 22. This is necessitated in order to insure that the variable threshold circuit 20 will not produce a false indication of the presence of a target in response to the radiated pulse 13 being coupled into the receiving antenna 16.

The range gate 21 which may be a monostable multivibrator produces a positive square gating pulse having a pulse width equal to the time duration that the detector circuit 10 is to be sensitive to incoming signals. The positive square gating pulse is coupled into the second terminal of the AND gate 34 and the base terminal 40b of the transistor 40. The positive square gating pulse is inverted at the collector terminal 40c of the transistor 40 and differentiated by the capacitor 41 and the resistor 42 to provide a negative pulse coincident with the leading edge of the range gate and a positive pulse coincident with the trailing edge of the range gate. Although both pulses are applied to the positive electrode of the tunnel diode 27, only the negative pulse is necessary to set the tunnel diode 27 to its first low voltage stable state. The second positive pulse resets the tunnel diode 27 to its second high voltage stable state in the absence of noise or an input pulse of sufficient amplitude to produce switching of the tunnel diode 27 during the duration of the gating pulse. However, the second positive pulse could be eliminated without producing any detrimental effect to the operation of the circuit.

The d.c. current through the tunnel diode 27 is the sum of a fixed current through the resistor 46 from the supply voltage V+ and a variable bias current through the low pass filter 44, transistor 43 and resistor 45 from the supply voltage V+. The base current through the resistor 30 and transistor 31 is negligible when the tunnel diode 27 is in its low voltage stable state since the base-emitter voltage of transistor 31 is held low. The total d.c. current through the diode 27 is close to the specified $I_{PEAK}$ for the tunnel diode 27 and the load line for the tunnel diode 27 is set so that the tunnel diode 27 can be either in its first low voltage stable state or its second high voltage stable state. The negative pulse coincident with the leading edge of the range gate 21 sets the tunnel diode 27 in its first low voltage stable state. During this time the transistor 31 is not conducting. However, if an input pulse 15 or noise of sufficient magnitude exceeds the threshold level of the tunnel diode 27 it switches into its second higher voltage stable state producing a positive level which is coupled through the resistor 30 into the base terminal 31b of the transistor 31. The transistor 31 will conduct forcing the voltage level at the collector terminal 31c to decrease to a low voltage level which will be coupled into the input of the inverter 33. The inverter 33 then produces a positive-going voltage level which is coupled into the first input terminal of the AND gate 34. Since the second terminal on the AND gate 34 is already at a positive level due to the presence of the positive square pulse from the range gate 21, the output of the AND gate 34 is positive and is coupled into the first input terminal on the AND gate 35. The second input terminal on the AND gate 35 is positive due to the delayed clock pulse applied from the delay circuit 36 which has a time constant $T_1$ selected to provide a positive output from the delay circuit 36 commencing immediately following the leading edge of the gating pulse and continuing during the remaining portion of the range gating interval. The delay time $T_1$ prevents a momentary, erroneous output from AND gate 35 at the leading edge of the gating pulse, before the tunnel diode 27 has been set to its first low voltage stable state. The AND gate 35 provides a positive going voltage level at its output terminal which is coupled into the stretcher pulse generator 23 which may be a monostable multivibrator similar to the monostable multivibrator 32 described in the aforementioned prior art U.S. Pat. No. 3,755,696. The output of the stretcher pulse generator 23 is coupled into the first input terminals on the counters 24 and 25 and is maintained at this level until the counters 24 and 25 receive the delayed clock pulses at their respective second input terminals from the output terminal of the delay circuit 22.

At the end of the range gate the input to the second terminal on the AND gate 34 goes from a high voltage level to a low voltage level. As a result, a positive voltage level will not be coupled from the output of the AND gate 34 to the AND gate 35 to provide an erroneous indication of the presence of a target, Furthermore, if the tunnel diode 27 should inadvertently change state from its first low voltage state to its second high voltage state during the interval following the range gate an erroneous indication of the presence of a target will be inhibited by the low voltage input present on the second terminal of the AND gate 34.

The delay circuit 36 has a time constant $T_1$ which is sufficiently long to insure that an erroneous indication of the presence of a target is not produced when the following conditions occur. Specifically, if the tunnel diode 27 is in its high voltage state prior to the occurrence of the negative pulse from the capacitor 41 which is time coincident with the leading edge of the positive square wave pulse from the range gate 21, then a very short positive pulse can be coupled from the positive electrode of the tunnel diode 27 through the resistor 30 to the base terminal 31b of the transistor 31. The collector terminal 31c will produce a negative pulse which is coupled through the inverter 33 to the first input terminal of the AND gate 34. Since the second terminal of the AND gate 34 is positive due to the positive square wave pulse from the range gate 21, a positive pulse will be produced at the output of the AND gate 34 and will be coupled into the first input terminal of the AND gate 35. If the clock pulse from the transimitter pulse generator 11 were coupled directly into the second terminal of the AND gate 35 a positive pulse would appear at the output of the AND gate 35 in response to the positive pulse coupled into the first input terminal of AND gate 35 and produce an erroneous indication of the presence of a target. Therefore, the delay $T_1$ of the delay circuit 36 is selected to insure that the very short positive pulse which can be produced at the positive electrode of the tunnel diode 27 is inhibited so that an erroneous target indication cannot be produced.

Figure 4:
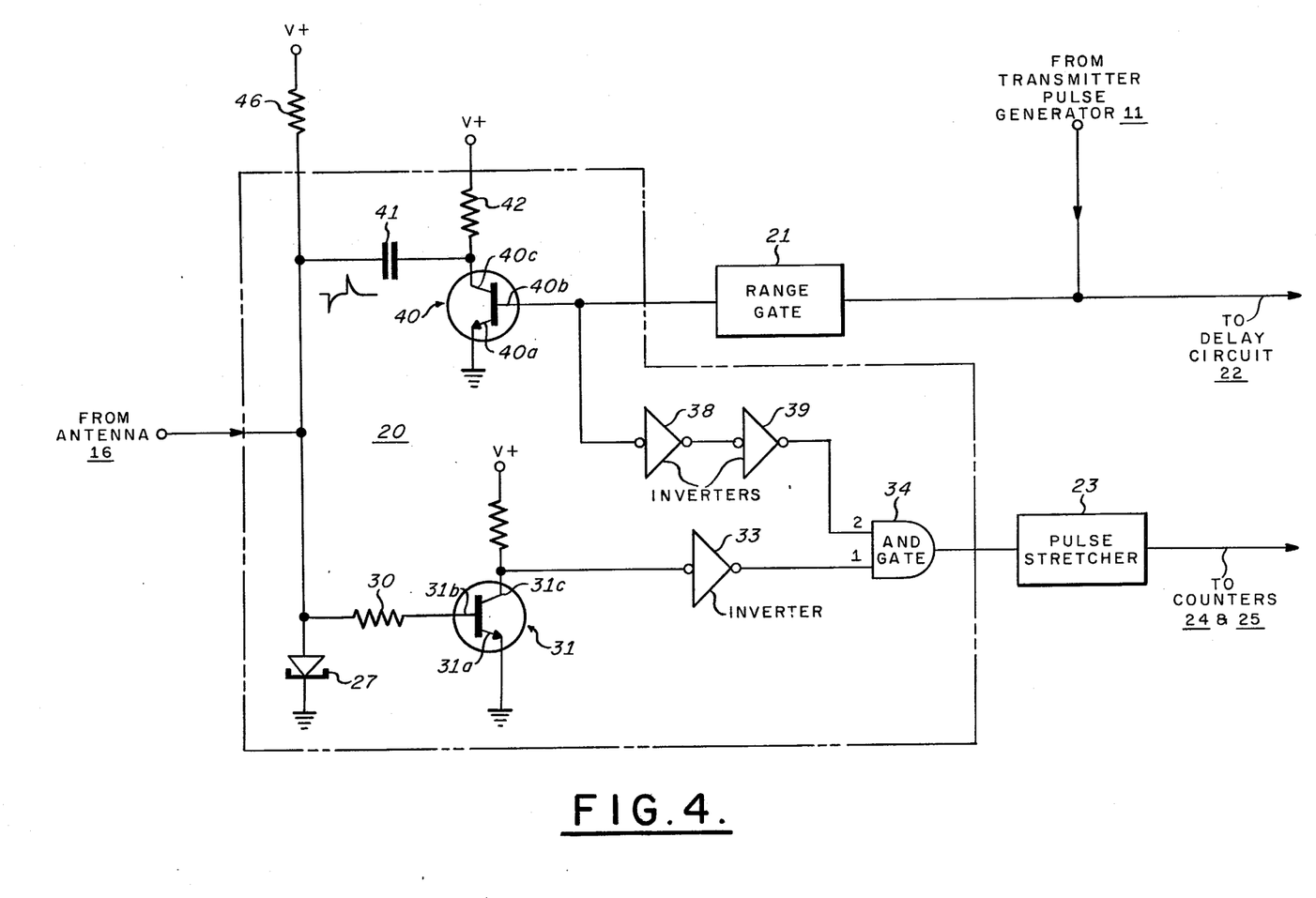
FIG. 4 is a block diagram including details in schematic form of an alternate embodiment of a portion of the constant false alarm rate detector shown in FIG. 2.

Alternatively the delay $T_1$ produced by the delay circuit 36 may be produced by inserting a propagation delay between the base 40b of transistor 40 and the second input terminal of AND gate 34. The duration of this propagation delay should be a fractional period of time longer than the time required for the negative pulse from transistor 40 to coupled through capacitor 41 and set the tunnel diode 27 to its first low voltage stable state. In one embodiment of this portion of the detector 10 as shown in FIG. 4, two series connected inverters 38 and 39 of the same type as inverter 33 were connected between the base 40b and the second input terminal of AND gate 34 to provide the delay $T_1$. This alternate configuration enabled the delay circuit 31 and the AND gate 35 to be omitted and the output terminal of the AND gate 34 to be connected directly to the input terminal of the pulse stretcher 23.

The tunnel diode 27 is thus effective as a detector from the moment that it recovers from the negative pulse coincident with the leading edge of the positive square gating pulse until the termination of this gating pulse produced by the range gate 21.

The improved variable threshold device 20 includes a bistable circuit element such as the tunnel diode 27 which has its negative electrode connected to ground and its positive electrode connected to be responsive to four different signals, namely, (1) the signal input from the antenna 16; (2) the range gate in the form of negative and positive pulses from the range gate 21; (3) the d.c. bias current from the resistor 46; and (4) the d.c. feedback bias current from the low pass filter 44. In addition, the positive electrode also provides the output logic level indication when an input signal or noise in excess of the threshold value of the tunnel diode 27 is received. In comparison, the avalanche transistor circuitry of the prior art device received the input signal on its base electrode, received the range gate on its emitter electrode and provided the output logic level on its collector electrode which also received the d.c. bias current and the feedback shunt current.

The output pulse produced by the stretcher pulse generator 23 is simultaneously applied to the input terminals 1 of the first and second counters 24 and 25. These input signals are clocked into the counters by the delay pulse coupled from the output of the delay circuit 22 and applied to the input terminals 2 on the first and second counters 24 and 25.

The first counter 24 has a threshold level M such that when the total number of pulses coupled into the counter 24 from the stretcher pulse generator 23 is equal to or greater than M, an output signal is produced by the first counter 24 which indicates the presence of a target or an alarm condition.

The second counter 25 which may be an N-input summation device produces an analog output signal having an amplitude proportional to the number of pulses clocked into the counter 25 from the stretcher pulse generator 23. The amplitude of the analog output signal produced by the counter 25 changes at a rate proportional to the rate at which the pulses are produced at the output of the stretcher pulse generator 23 which in turn is proportional to the rate at which outputs are produced from the variable threshold device 20 at the output of the AND gate 35. The analog output signal from the counter 25 is coupled into the base terminal 43b of the transistor 43 which in combination with the long time constant low pass filter 44 is designed to alter the bias current coupled to the tunnel diode 27 so that on average over a period of time the d.c. bias current supplied back to the tunnel diode 27 through the resistor 45, transistor 43, and low pass filter 45 controls the threshold level of the tunnel diode 27 so that it will fire with some known low probability due to noise in the absence of input pulses 15. However, because of the long time constant in the low pass filter 44 the feedback loop does not so de-sensitize the tunnel diode 27 that it will not repeatedly change state from its first low voltage state to its second high voltage state in response to a train of input pulse 15 received at the antenna 16.

A preferred embodiment of the invention incorporated in a constant false alarm rate detector which was actually reduced to practice included a variable threshold device 20 and a long time constant series feedback circuit 26. This embodiment included integrated circuits and discrete components used in combination with a five volt power supply which was compatible with conventional digit logic elements such as TTL elements.

Figure 3:
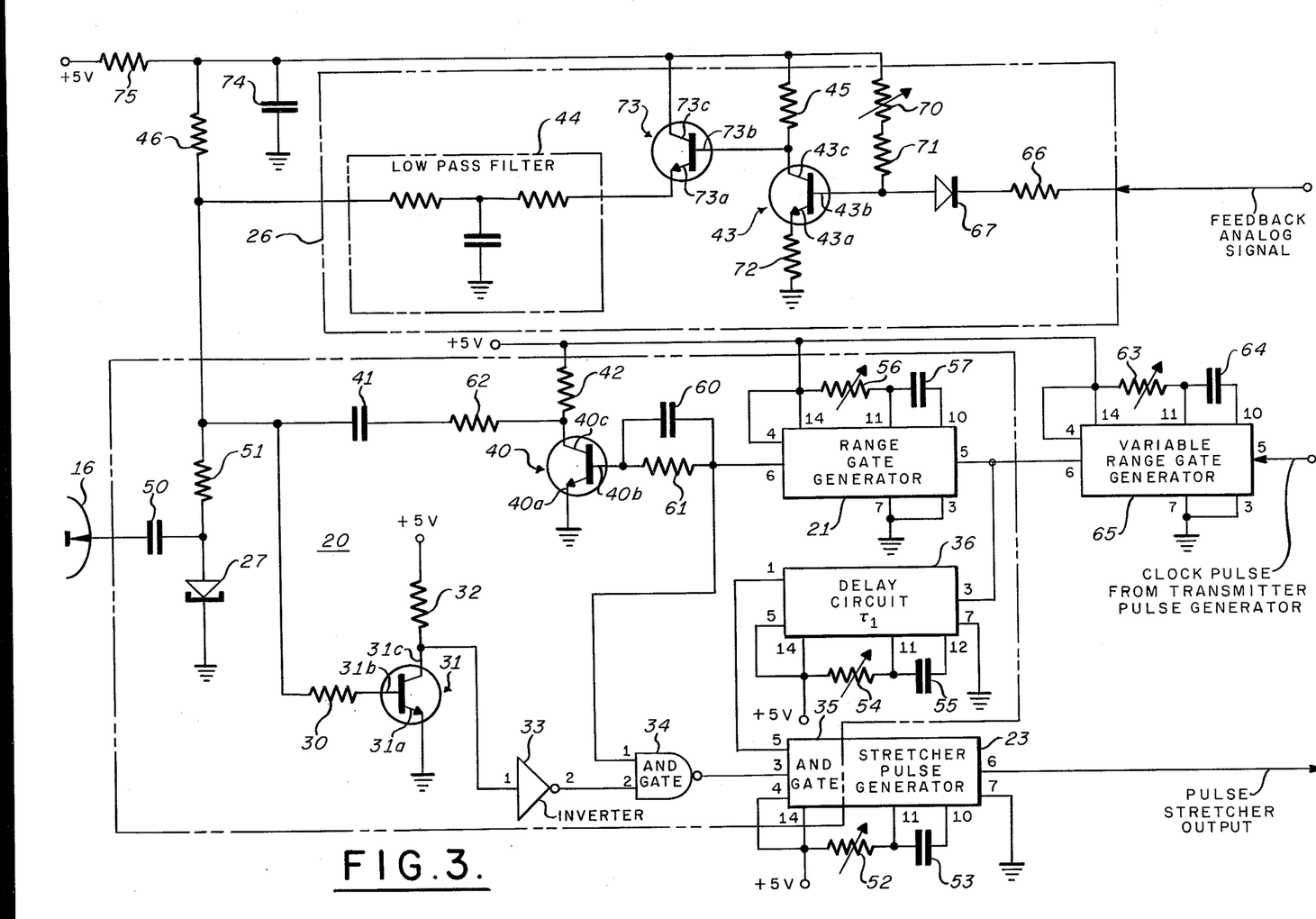
FIG. 3 is a detailed schematic diagram of a preferred embodiment of the constant false alarm detector incorporating the subject invention.

As shown in FIG. 3, this embodiment included a receiving antenna 16 coupled to the variable threshold device 20 through a coupling capacitor 15 to the common junction of the first terminal of a resistor 51 and the positive electrode of a tunnel diode 27. In FIG. 3 elements which are common to those shown in FIGS. 1 and 2 have the same reference numerals.

The negative electrode of the tunnel diode 27 is connected to ground. The second terminal of the resistor 51 is connected to the first terminal on a resistor 30 which has its second terminal connected to the base electrode 31b of a transistor 31. The emitter terminal 31a is connected to ground and the collector terminal 31c is connected to the junction of the first terminal on a resistor 32 and the input terminal 1 on an inverter 33. The second terminal on the resistor 32 is connected to the +5 volt power supply. The output terminal 2 of the inverter 33 is connected to the input terminal 2 of an AND gate 34. The output terminal 3 of the gate 34 is connected to an input terminal 3 on a second AND gate 35 which has its output terminal coupled into a stretcher pulse generator 23.

In the embodiment shown in FIG. 3 the second AND gate 35 and the stretcher pulse generator 23 are contained in a single monostable multivibrator such as the TTL circuit designated SN74121, manufactured by Texas Instruments, Inc. In order for this circuit to provide this type of operation terminal 4 and terminal 14 are connected together and connected to a source of +5 volts. The junctions of terminals 4 and 14 are also connected to the first terminal on a variable resistor 52 which has its second terminal connected to the junction of terminal 11 on the pulse stretcher generator 23 and the first terminal on a capacitor 53. The second terminal on the capacitor 53 is connected to terminal 10 on the generator 23. The terminal 7 on the generator 23 is connected to ground and the terminal 6 provides an output which is coupled into the input terminals 1 on the counters 24 and 25 in the same manner as shown in FIG. 2. The input terminal 5 is connected to the output terminal 1 on the delay circuit 36 which may also be comprised of a monostable multivibrator such as the integrated TTL circuit element SN74121, used as the second AND gate 35 and stretcher pulse generator 23 described above.

However, in connecting the monostable multivibrator for use as a delay circuit pins 5 and 14 are connected together and, in turn, connected to a source of +5 volts. A first terminal on a variable resistor 54 is connected to the junction of terminals 5 and 14 and the second terminal on the resistor 54 is connected to the junction of pin 11 and the first terminal on a capacitor 55. The second terminal on the capacitor 55 is connected to pin 10 of the delay circuit 36. Terminal 7 is connected to ground and terminal 3 is connected to the input terminal 5 on the range gate generator 21.

The range gate generator 21 may also be a monostable multivibrator of the same type used for the delay circuit 36. However, when used as a range gate generator the terminals 3 and 7 are connected to ground and the terminals 4 and 14 are connected to a source of +5 volts. The first terminal of a variable resistor 56 is connected to the junction of the terminals 4 and 14 and the second terminal is connected to terminal 11 and the first terminal on a capacitor 57. The second terminal on the capacitor 57 is connected to the terminal 10. The output terminal 6 is coupled to the junction of the first terminals on a capacitor 60, a resistor 61 and the AND gate 34.

The capacitor 60 and the resistor 61 form a parallel input coupling network having their second terminals connected together and connected to the base terminal 40b on the transistor 40. The emitter terminal 40a is connected to ground and the collector terminal 40c is connected to a common junction between the first terminal on a resistor 42 and the first terminal on a resistor 62. The second terminal of the resistor 42 is connected to a source of +5 volts and the second terminal on the resistor 62 is connected through a capacitor 41 to the common junction of the resistor 30 and the resistor 51.

The clock pulses from the transmitter pulse generator are coupled into the detector circuit 10 through a variable range gate delay generator 65 which may also be an integrated TTL monostable multivibrator such as an SN74121 which is used for the range gate generator 21 and has the same circuit connections, i.e., pins 3 and 7 are connected to ground; pin 5 receives the input clock pulses from the transmitter pulse generator 11, the output signal is produced at pin 6 and coupled to pin 5, the input terminal on the range gate generator 21, and pin 3, the input on the delay circuit 36; pins 4 and 14 are connected to a source of +5 volts; a variable resistor 63 is coupled between the junction of pins 4 and 14 and the junction of pin 11 and the first terminal on a capacitor 64; and the second terminal on the capacitor 64 is connected to pin 10.

The feedback analog signal from the counter 25 (shown in FIG. 2) is coupled to the series feedback circuit 26 through the series combination of a resistor 66 and a diode 67. The feedback signal is applied to the first terminal of the resistor 66 which has its second terminal connected to the cathode of the diode 67. The anode of the diode 67 is connected to the junction of the first terminal on a resistor 71 and the base terminal 43b of the transistor 43. The second terminal on the resistor 71 is connected to a first terminal on a resistor 70 which has its second terminal connected to a first terminal on a resistor 45. The second terminal on the resistor 45 is connected to the junction of the collector electrode 43c of transistor 43 and the base electrode 73b of a transistor 73. The emitter terminal 43a is connected through a resistor 72 to ground. The collector terminal 73c of the transistor 73 is connected to the junction of the resistors 45 and 70. The emitter terminal 73a is connected to the input terminal of the low pass filter 44.

The output terminal of the low pass filter 44 is connected to the common junction of the resistor 30, the capacitor 41, resistor 51 and resistor 46. The other terminal on the resistor 46 is connected to the common junction of the first terminal on the capacitor 74, the electrode 73c and the junction of the resistors 45 and 70. The second terminal on the capacitor 74 is connected to ground and the second terminal on the resistor 75 is connected to the source of +5 volts.

In operation a clock pulse from the transmitter pulse generator 11 is applied to pin 5 of the monostable multivibrator 65 causing an output pulse to be produced at pin 6. The trailing edge of this output pulse is controlled by varying resistor 63. The output pulse is coupled into the input terminal 5 on the range gate generator 21 and the input terminal 3 on the delay circuit 36. The trailing edge of the input pulse on pin 5 of the range gate generator 21 determines the temporal position of the leading edge of the gating pulse and the width of the gating pulse is controlled by varying resistor 56. The range gate generator 21 produces a gating pulse on pin 6 which is coupled through the high frequency coupling circuit comprised of the parallel combination of capacitor 60 and resistor 61 into the base terminal 40b of the transistor 40. The leading edge of the gating pulse from the range gate generator 21 is differentiated by the combination of the resistor 42 and capacitor 41 to produce a negative pulse coincident with the leading edge of the gating pulse from terminal 6 on the range gate 21. This negative pulse is coupled through resistor 51 to the positive electrode on the tunnel diode 27 and sets the tunnel diode into its first low voltage stable state. The output pulse from the range gate generator 21 on terminal 6 is simultaneously applied to the input terminal 1 on AND gate 34.

The output pulse from the monopulse multivibrator 65 which is applied to input terminal 3 on the delay circuit 36 produces a negative output pulse on terminal 1 in response to the trailing edge of the input pulse applied to input terminal 3. The negative output pulse from terminal 1 on the delay circuit 36 is applied to input terminal 5 on the second AND gate 35.

In response to an input signal or noise having an amplitude in excess of the instantaneous value of the threshold level of the tunnel diode 27, the tunnel diode 27 will change state to its second high voltage stable state.

The voltage level at the junction of the resistor 51 and the resistor 30 will increase in response to the change in state of the tunnel diode 27. The increased voltage will be coupled to the base electrode 31b of the transistor 31 causing it to conduct. As a result, the voltage level at the collector electrode 31c will decrease producing an increase in the voltage level at the output terminal 2 of the inverter 33. The increased voltage level will be applied to the second input terminal 2 of the first AND gate 34. Since the first input terminal is already positive due to the output pulse at terminal 6 of the range gate 21, the voltage level at the output terminal 3 of the first AND gate 34 will decrease because the actual element used for the AND gate 34 was a type 7400 NAND gate. Thus the low level output voltage on terminal 3 will be applied to input terminal 3 on the second AND gate 35 which is an integral part of the TTL circuit element designated SN74121. The trailing edge of the pulse applied to input terminal 5 on the second AND gate 35 will produce a positive pulse on output terminal 6 which will be applied to the input terminals on the respective counters 24 and 25.

The counter 24 will function as described above with respect to FIGS. 1 and 2 to produce an alarm signal when a sufficient number of input signals have been received to produce an alarm condition.

The counter 25 will function as described above with respect to FIGS. 1 and 2 to produce a feedback analog signal that will be coupled through the resistor 66 and diode 67 to the base electrode 43b of the transistor 43. The transistor 73 in combination with the resistor 43 will act as a switch to control the current fed to the tunnel diode 27 through the resistor 45 and low pass filter 44. As previously described, the long time constant of the low pass filter 44 will slowly vary the instantaneous value of the variable threshold level of the tunnel diode 27 in response to noise coupled to the tunnel diode 27 which has an amplitude in excess of the instantaneous value of the variable threshold. However, because of the long time constant associated with the low pass filter 44, the variable threshold level of the tunnel diode 27 will not vary appreciably in the relatively short period of time during which a train of pulses is received from an actual target. Thus the detector will have a substantially constant false alarm rate in response to noise or slowly varying drift in the +5 volt power supply.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a constant false alarm rate detector for use with a signal source which provides input signals at known repetition rates within a useful frequency band to said detector in an environment where noise is present, said detector including a range gate generator, a long time constant feedback circuit and an improved variable threshold means comprising
   bistable circuit means having a first terminal coupled to an output terminal of said long time constant feedback circuit, a variable threshold, and first and second stable states for switching from said first stable state to said second stable state in response to noise or input signals of an amplitude greater than the instantaneous value of the variable threshold,
   control circuit means coupled between said range gate generator and said first terminal of the bistable circuit means for setting the bistable circuit means to said first stable state and for regulating the period of time during which the detector is sensitive, and
   logic circuit means coupled to said control circuit means, said first terminal of said bistable circuit means and an input terminal of said long time constant feedback circuit for providing an output signal in response to the bistable circuit means switching from said first stable state to said second stable state during the period of time said detector is sensitive.

2. In a constant false alarm rate detector including an improved variable threshold means as recited in claim 1 wherein the bistable circuit means includes a tunnel diode in which its positive electrode is said first terminal and its negative electrode is connected to ground.

3. In a constant false alarm rate detector including an improved variable threshold means as recited in claim 1 wherein said control circuit means includes means for producing a first pulse for setting said bistable circuit means to said first stable state and means for producing a second pulse for regulating the period of time during which the detector is sensitive.

4. In a constant false alarm rate detector including an improved variable threshold means as recited in claim 3 wherein said means for producing said first and second pulses includes amplifier means coupled to differentiator means.

5. In a constant false alarm rate detector including an improved variable threshold means as recited in claim 4 wherein said amplifying means and said differentiator means include a transistor in combination with a resistor and a capacitor.

6. In a constant false alarm rate detector including an improved variable threshold means as recited in claim 3 wherein said means for producing a second pulse includes means for varying the occurrence of the leading edge and the pulse width of said second pulse.

7. In a constant false alarm rate detector including an improved variable threshold means as recited in claim 6 wherein said means for varying the occurrence of the leading edge and the pulse width of said second pulse includes a first monostable multivibrator for producing a first variable pulse width pulse and a second monostable multivibrator responsive to the trailing edge of said first variable pulse width pulse for producing said second pulse having a variably occurring leading edge and a variable pulse width.

8. In a constant false alarm rate detector including an improved variable threshold means as recited in claim 1 wherein said logic circuit means includes first AND gate means having a first input terminal coupled to the output terminal of said bistable circuit means and a second input terminal coupled to the output terminal of said range gate generator means for providing an output signal in response to said bistable circuit means switching from said first stable state to said second stable state during the period of time the detector is sensitive.

9. In a constant false alarm rate detector including an improved variable threshold means as recited in claim 8 further including:
   first delay circuit means having an input terminal coupled to the input terminal of said range gate generator and having a delay $T_1$ associated therewith, and
   second AND gate means having a first terminal coupled to the output terminal of said first AND gate means and a second input terminal coupled to the output terminal of said delay circuit means for producing an output signal in response to said output signal from said first AND gate means only after a predetermined time following the occurrence of said first pulse.

10. In a constant false alarm rate detector as recited in claim 8 wherein said logic circuit means further includes
    amplifier means in series combination with inverter means, said combination being coupled between said bistable circuit means and said first AND gate means for providing an output signal of a specific polarity and sufficient amplitude to produce an output signal from said first AND gate in response to said bistable circuit means switching from said first stable state to said second stable state.

11. In a constant false alarm detector including an improved variable threshold means as recited in claim 8 wherein said logic circuit means further includes:
    second delay circuit means coupled between the output terminal of said range gate generator means and said second input terminal of said first AND gate means for inhibiting said first AND gate means from changing its output state until after said bistable circuit means is set to its first low voltage stable state.

12. In a constant false alarm detector including an improved variable threshold means as recited in claim 11 wherein said first delay circuit means includes:

a pair of series connected inverter circuits.

* * * * *